(12) United States Patent
Zhu et al.

(10) Patent No.: US 11,425,171 B2
(45) Date of Patent: Aug. 23, 2022

(54) METHOD AND SYSTEM FOR CRYPTOGRAPHIC ATTRIBUTE-BASED ACCESS CONTROL SUPPORTING DYNAMIC RULES

(71) Applicant: UNIVERSITY OF SCIENCE & TECHNOLOGY BEIJING, Beijing (CN)

(72) Inventors: Yan Zhu, Beijing (CN); Ruyun Yu, Beijing (CN); Hao Yin, Beijing (CN); Yao Qin, Beijing (CN)

(73) Assignee: UNIVERSITY OF SCIENCE & TECHNOLOGY BEIJING, Beijing (CN)

( * ) Notice: Subject to any disclaimer, the term of this patent is extended or adjusted under 35 U.S.C. 154(b) by 239 days.

(21) Appl. No.: 16/759,917

(22) PCT Filed: Jan. 31, 2018

(86) PCT No.: PCT/CN2018/074646
§ 371 (c)(1),
(2) Date: Apr. 28, 2020

(87) PCT Pub. No.: WO2019/090988
PCT Pub. Date: May 16, 2019

(65) Prior Publication Data
US 2020/0404023 A1    Dec. 24, 2020

(30) Foreign Application Priority Data
Nov. 9, 2017 (CN) .......................... 201711100571.2

(51) Int. Cl.
*H04L 29/06* (2006.01)
*H04L 9/32* (2006.01)
*H04L 9/40* (2022.01)

(52) U.S. Cl.
CPC ............ *H04L 63/20* (2013.01); *H04L 9/3268* (2013.01); *H04L 63/06* (2013.01); *H04L 63/0807* (2013.01); *H04L 63/10* (2013.01)

(58) Field of Classification Search
CPC ....... H04L 63/20; H04L 9/3268; H04L 63/06; H04L 63/0807; H04L 63/10
See application file for complete search history.

(56) References Cited

U.S. PATENT DOCUMENTS 10,235,176 B2 *  3/2019  DeHon ................... G06F 21/52
10,261,794 B2 *  4/2019  DeHon ............... G06F 12/1458
(Continued)

FOREIGN PATENT DOCUMENTS

| CN | 103327002 A | 9/2013 |
| CN | 104901942 A | 9/2015 |
| CN | 106059763 A | 10/2016 |

*Primary Examiner* — Yonas A Bayou
(74) *Attorney, Agent, or Firm* — Dilworth & Barrese, LLP (57) ABSTRACT

The present invention mainly relates to the field of information technology, and specifically to a method and system for cryptographic attribute-based access control supporting dynamic rules. In the system, the protected object is stored in an encrypted form, only the access request satisfying the access policy in attribute-based access control can be authorized to decrypt the object, which ensures that the access to data in an unsecure environment can be authorized according to a security policy, and supports dynamic policy and real-time authorization of attributes. The method and system for cryptographic attribute-based access control supporting dynamic rules in this invention have already separated from traditional encryption system framework, are totally new attribute-based access control model, method and system supporting cryptographic determination, can achieve more secure, diversified, dynamic and flexible access authorization, are suitable for large-scale organizations or information (Continued)

systems, and can be applied to the environments such as Cloud computing, grid computing, and distributed computing.

9 Claims, 2 Drawing Sheets

(56) References Cited

U.S. PATENT DOCUMENTS

| | | | | |
|---|---|---|---|---|
| 10,521,230 B2* | 12/2019 | DeHon | ............... | G06F 9/30098 |
| 10,545,760 B2* | 1/2020 | DeHon | ............... | G06F 9/30101 |
| 10,642,616 B2* | 5/2020 | DeHon | ............... | G06F 9/30098 |
| 10,725,778 B2* | 7/2020 | DeHon | ............... | G06F 9/30098 |
| 10,754,650 B2* | 8/2020 | DeHon | ............... | G06F 9/30072 |
| 10,936,713 B2* | 3/2021 | Dehon | ................ | G06F 21/6209 |
| 11,150,910 B2* | 10/2021 | Milburn | ............... | G06F 12/1466 |
| 11,182,162 B2* | 11/2021 | DeHon | ............... | G06F 12/1408 |
| 11,340,902 B2* | 5/2022 | DeHon | ................ | G06F 9/3867 |
| 2017/0126687 A1* | 5/2017 | Martinelli | ............. | H04L 63/101 |
| 2017/0214529 A1* | 7/2017 | Barbosa E Oliveira | ..................... H04L 9/3247 | |

* cited by examiner

METHOD AND SYSTEM FOR CRYPTOGRAPHIC ATTRIBUTE-BASED ACCESS CONTROL SUPPORTING DYNAMIC RULES

FIELD OF THE INVENTION

The present invention mainly relates to the field of information technology, and specifically to a method and system for cryptographic attribute-based access control supporting dynamic rules. The method and system support dynamic authorization of attributes and the dynamic binding of policy and ciphertext, are suitable for large-scale organizations or information systems, and can be applied to environments such as Cloud computing, grid computing, distributed computing.

BACKGROUND

Access control is one of the core technologies to guarantee the security of information systems. Its mission is to ensure the digital assets are not illegally used, and usually refers to making different authorization access from a subject to a object itself or its resource according to certain access policies or competence.

In recent years, a new type of access control technology called Attribute-based Access Control (ABAC) has been proposed along with the continuous growth of network application diversity and system scale. It uses the attributes of related entities (such as subject, object, action, and environment, etc.) as the basis of authorization to achieve access control where attribute is a certain feature and relationship of things, and provides more flexible, dynamic, fine-grained authorization control. ABAC can support open network environment.

Attribute-based access control is a fine-grained, multi-factor method which is based on access policies. It consists of four attribute entities, subject, object, action and environment, which are represented as S, O, A, and E, respectively; each attribute entity can issue several attributes, each of which can be assigned one or more attribute values. Attributes can be divided into static attributes and dynamic attributes, where environment attributes are usually a kind of dynamic attributes, such as access time, location, device, historical information, etc. The value of environment attribute is dynamic and time-varying.

The attribute-based access control defines the authorization relationship among the entities through the access control policy (referred to as access policy). Specifically, the policy consists of a series of rules to constrain whether a subject is allowed to access an object with an action in a certain environment. Further, the access policy is determined on the attribute values of subject, object, action, and environment. The diversity and dynamics of attributes, and the rich semantics of the access policy make ABAC flexible and scalable enough. At the same time, secure anonymous access is possible because there is no need to make policy decisions on the requester's real name, which is very important in an open environment.

The attribute-based access control model includes the following basic functional modules, which are described as follows:

(1) Policy Administration Point (PAP): responsible for creating access policies and managing them effectively;

(2) Policy Information Point (PIP): responsible for the binding of attribute information and entities, and the creation and management of attributes;

(3) Policy Enforcement Point (PEP): responsible for processing the access request and executing the decision result returned by the PDP;

(4) Policy Decision Point (PDP): responsible for making policy decisions on access requests sent by PEP.

With the enhancement of network sharing and openness, the protection boundary of information system is increasingly blurred or completely disappeared. The attribute-based access control method based on the explicit defense boundary can no longer adapt to this open environment.

Existing ABAC models are non-cryptographic, either representation of access policies, representation of entity attribute assignments, or decision-making in access policy are non-cryptographic. In an open environment without trusted (or secure) operational entities, these non-cryptographic representations may be tampered with or forged by the adversary. Obviously, the correctness of the access authorization cannot be guaranteed, and high security strength requirement of real-time data sharing system cannot be satisfied. Therefore, the cryptographic implement of attribute assignment, policy, and decision-making in ABAC model is a difficult problem that the prior art cannot solve.

Attribute-based Encryption (ABE) is a cryptographic technology that associates access policy with ciphertext, and integrates attribute assignment into user's private key. Users can decrypt ciphertext if and only if the attributes in the user's private keys match the policy in ciphertext. However, in this kind of ABE, the access policy is fixed in the ciphertext and cannot be changed, so it is not scalable. Moreover, the attribute assignment and the corresponding private key are fixed and cannot support dynamic attributes.

SUMMARY

Aiming at the above technical problems, the invention proposes a method and system for cryptographic attribute-based access control supporting dynamic rules, which combines ABAC model and cryptographic techniques. In the system, protected objects are stored in an encrypted form, which means that the objects can't be accessed unauthorized although they are placed in an open, unsecure environment. The access can be authorized to decrypt the objects only if the access policy in the attribute-based access control is satisfied, which ensures that objects in an unsecure environment can be authorized to access according to secure policies.

The method and system of the present invention can support the complete ABAC model, rule-based and scalable cryptographic policy generation, and real-time acquisition of attribute. The method and system make the access authorization process efficient, dynamic and secure, and ensure the consistency and integrity of access rules in the system.

The invention is achieved by using the following technical solutions:

A system for cryptographic attribute-based access control supporting dynamic rules, wherein protected objects are stored in an encrypted form; access can be authorized to decrypt the objects only if access policy in the attribute-based access control is satisfied; access authorization is based on security token which is dynamically acquired; session key is escrowed into policy center in an encrypted form; access policy is used to dynamically generate cryptographic policy.

Further, the system consists of three storage modules and one perception module:

policy storage module (PSM) is used to store access policies;

attribute storage module (ASM) is used to store attributes and attribute assignments of entities in the system;

object storage module (OSM) is used to store encrypted objects;

environment perception module (EPM) is used to obtain environment attributes and attribute assignments in real-time and dynamically.

The system also consists of four function units:

policy generation unit (PGU) selects an access policy from PSM, generates a cryptographic representation of the access policy, i.e., cryptographic policy (CP), and provides it to policy decision unit;

token generation unit (TGU) acquires an attribute assignment of a specific attribute from ASM or EPM, and generates a cryptographic representation of the attribute assignment, i.e., attribute token (AttToken), and provides all possible AttTokens to policy decision unit;

policy decision unit (PDU) obtains CP from PGU and AttTokens from TGU, makes cryptographic policy decision on them to generate the determination result information, i.e., decryption token (DecToken), which is provided to object decryption unit;

object decryption unit (ODU) decrypts the encrypted object according to DecToken returned by PDU, i.e., ODU can decrypt the encrypted object if and only if the determination result of PDU is permission.

Further, the system adopts the attribute-based access control (ABAC) model, wherein the system comprising:

entity set consists of four attribute entities for subject, object, action, and environment, which are represented by S, O, A, E, respectively; and a policy center P to manage secure policies;

access policy consists of several rules and can be converted into the form of Boolean function, i.e., using the Boolean function $F(x_1, x_2, \ldots x_n) = \{True, False\}$ to describe a logical relationship between any attribute variable $x_i \in X$ in the attribute entity $X \in \{S, O, A, E\}$ and the access permission (True) or denial (False);

authorization process is used to obtain attribute values $(v_1, v_2, \ldots, v_n) \rightarrow (x_1, x_2, \ldots, x_n)$ from each attribute entity, and match them with the specified access policy, i.e., making evaluation on $F(v_1, v_2, \ldots, v_n)$ to determine whether the access is authorized.

Further, the rules have the same grammar structure as the access policy, and can be combined as a access policy by using Boolean logic; the rules can be represented as Boolean functions whose inputs are attribute variables, and Boolean function is composed of Boolean logics on several predicates, each of which is a logical decision on operator that acts on attribute variables; the Boolean logics include logical AND, OR, and NOT; the operators include Equality, Greater than, Less than, positive and negative membership, and containment relationship.

Both the AttToken and the DecToken belong to security tokens, which are temporary, unforgeable, and publicly verifiable digital certificate, and their validity can be proved by using cryptographic verification methods, wherein the AttToken is a cryptographic certificate for attribute assignment, comprises non-tamperable information of attributes and attribute values, and also time-varying parameter information to ensure unforgeability and instantaneous validity of the token; wherein the time-varying parameter information can be a random number, a count value, or a time stamp;

the DecToken is a cryptographic certificate for decrypting the ciphertext of the session key, and comprises secret information and time-varying parameter information for retrieving the session key which is required for decrypting the encrypted object.

Further, object is stored in an encrypted form, and the encryption algorithm can be any symmetric and asymmetric encryption algorithm;

Further, distributed authorization is implemented by replacing decryption keys with AttTokens, and these tokens are publicly verifiable;

Further, the AttToken can be acquired in real-time, the policy determination result may be different when the same subject has the same access request to the same object in different environments;

Further, cryptographic policy from PGU is dynamically generated such that it can be changed in real-time to affect the access authorization result;

Further, whether the encrypted object can be decrypted is determined by PDU, i.e., the subject can access the object if and only if the determination result is permission. Specifically, ODU decrypts and retrieves the encrypted objects by using the form of "cascade decryption": if the decision result of PDU is permission, ODU firstly decrypts the session key ek by using the DecToken, and then decrypts the encrypted objects with the session key ek.

Further, the system can implement policy scalability and attribute assignment dynamicity, wherein the policy scalability guarantees rules can be added, modified or revoked according to requirements, and the change can immediately affect the access authorization to encrypted objects in the system; the attribute assignment dynamicity ensures the system can get the current attributes of entities in real-time.

A method for cryptographic attribute-based access control supporting dynamic rules, which adopts the system and comprises:

1) object encryption: the object is stored in OSM in an encrypted form, and records all attribute information of the object in ASM;

2) subject's access request: a certain subject issues an access request to an encrypted object, the ODU receives the request and invokes the PDU to perform cryptographic determination on the request;

3) access authorization decision: after receiving the information of ODU, the PDU issues a policy query request to PGU and token query requests to TGUs for each attribute, performs cryptographic determination on the cryptographic policy returned by PGU and the AttTokens returned by TGU, sends determination result and the DecToken to ODU;

4) object decryption: ODU decrypts the encrypted object according to the DecToken returned by PDU, and then the subject can access the decrypted object.

Further, in the access authorization decision process, the cryptographic determination of a given access request is to make decision on the AttTokens and the cryptographic policy CP, and output the DecToken for object decryption; if the determination result of the cryptographic policy is permission, the DecToken is secret information for retrieval of the session key which can be used for the object decryption; otherwise, it is an invalid random number.

Further, the method and system for cryptographic attribute-based access control are based on standard ABAC model, and its feature is that cryptographic techniques are introduced into the following units:

1) policy generation unit (PGU) is built on PAP, which is responsible for not only managing of the policy, but also generating the cryptographic policy CP;

2) token generation unit (TGU) is built on PIP, which is responsible for not only collecting the attribute information, but also generating the publicly verifiable AttTokens;
3) policy decision unit (PDU) is built on PDP, which is responsible for making cryptographically determination on the collected AttTokens and the CP, and transmitting the determination result to ODU;
4) object decryption unit (ODU) is built on PEP, which is responsible for acquiring an encrypted object according to the access request of the subject, calling the PDU to perform an authorization decision process, and receiving the determination result from the PDU. As a result, if the determination result is permission, the encrypted object can be decrypted and the corresponding access action will be performed.

A method for constructing the cryptographic attribute-based access control model, the method adopts the system and comprises:
1) system initialization: invoke the system initialization algorithm Setup to generate the public key $pk_T$ and private key $sk_T$ of each entity T, and the public key $pk_P$ and the private key $sk_P$ of the policy center P, where $T \in \{S, O, A, E\}$;
2) object encryption: invoke the object encryption algorithm Encrypt to encrypt the object, realize key escrow of the session key ek for encrypting the object on the policy center P, i.e., applying the general encryption algorithm to encrypt the object, the encryption key is ek, and then encrypting ek with the public key $pk_P$ of the policy center P; this phase is used to implement the OSM;
3) policy generation: select a policy Π according to the current access request, invoke the policy generation algorithm PolicyGen to generate the cryptographic representation CP of the policy Π by using the public key $pk_T$ of entity T and the private key $sk_P$ of policy center P; this phase is used to implement the PGU;
4) token generation: each entity obtains the attribute assignment attr in real-time, calls the token generation algorithm TokenGen to generate the attribute token AttToken corresponding to attribute assignment attr; this phase is used to implement the TGU;
5) object decryption: the object decryption algorithm Decrypt is divided into two stages: wherein,
   a) policy verification: PDU performs cryptographic determination according to the cryptographic policy CP and the security attribute token AttToken for the attributes involved in the policy Π, outputs a secure decryption token DecToken for object decryption; this phase is used to implement the PDU;
   b) session key retrieval: if the secure decryption token DecToken is valid, the session key ek can be retrieved to decrypt the encrypted object and the requested action will be performed; otherwise, the key ek cannot be retrieved and the current access will be denied; this phase is used to implement the ODU.

Further, the method for constructing the cryptographic attribute-based access control model, comprising:
system initialization algorithm Setup: given a specified security strength, generate public key $pk_P$ and private key $sk_P$ for the policy center P, and public key $pk_T$ and private key $sk_T$ for each entity $T \in \{S, O, A, E\}$;
object encryption algorithm Encrypt: given the public key $pk_P$ of policy center P, generate ciphertext $C_{ek}$ of session key ek, and the session key ek can be used for decrypting the encrypted object;
token generation algorithm TokenGen: given private key $sk_T$ of entity $T \in \{S, O, A, E\}$, an attribute value attr, and a time-varying parameter t, generate the attribute token AttToken;
policy generation algorithm PolicyGen: given the public key $pk_T$ of each entity $T \in \{S, O, A, E\}$, the private key $sk_P$ of policy center P, an access policy Π, the time-varying parameter t, and the ciphertext $C_{ek}$ of session key ek, generate cryptographic policy CP of Π;
object decryption algorithm Decrypt: given the ciphertext $C_{ek}$ of session key ek, the ciphertext CP of policy Π, and a set of AttTokens corresponding to the attribute assignments, the session key ek can be retrieved if and only if the attribute assignments satisfy the policy Π.

Advantageous Technical Effects of the Present Invention (1) Compared with the existing ABE technology, the method and system for cryptographic attribute-based access control supporting dynamic rules in the present invention has been separated from the traditional encryption system framework, and is a new method and system for attribute-based access control supporting cryptographic determination. The method and system can satisfy higher security requirements, have policy scalability and attribute assignment dynamicity, and have the following features:
1) there is no user's private key, and real-time security token is used to replace private key for dynamic authorization;
2) the object owner escrows the access authorization in a way of object encryption with the public key of policy center;
3) an access policy is dynamically chosen from the rule set and then transformed to cryptographic policy;
4) each attribute entity in the system dynamically issues attribute tokens;
5) access authorization and decryption of the encrypted object are permitted by matching the attribute tokens with the cryptographic policy.

(2) In the present invention, the access authorization is based on a dynamic security token instead of a user's private key, and the attribute token is a cryptographic certificate for attribute assignment, that is, contains non-tamperable attribute value information, and time-varying parameters. The cryptographic certificate ensures the unforgeability and instantaneous validity of the token.

(3) In order to apply cryptography to the existing ABAC model, the cryptographic attribute-based access control model of the present invention employs several cryptographic techniques, including authorization escrow, object encryption, security tokens, homomorphic cryptography, hierarchical secret sharing, predicate encryption, and secure policy decision. Through the comprehensive application of the above techniques, the cryptographic system in the invention has provable security and semantic security under the chosen-plaintext attack even if the adversary obtains a large number of security tokens.

(4) The method and system for cryptographic attribute-based access control in the present invention supports policy scalability and dynamic acquisition of attribute tokens, and is a cryptographic solution for the existing ABAC system. The solution can be widely applied for sensitive data distribution in untrusted and open environments, rule-based authorization services, secure sharing of private data among different security domains, complex information systems such as grid computing, cloud computing, blockchain systems, social computing and mobile computing etc, and also for building an access control platform in dynamic environments. The method and system in this invention is the basic technology to ensure the security of the system.

In summary, in the method and system of the present invention, the cryptographic representation of attribute is implemented by using attribute token; at the same time, the cryptographic representation of policy is implemented by using cryptographic policy; finally, the cryptographic determination is achieved by using attribute token and cryptographic policy. The present invention makes it possible to achieve fine-grained, real-time, secure, and large-scale private data sharing.

DETAILED DESCRIPTION OF EXEMPLARY EMBODIMENTS

In the embodiments, the common Bilinear Pairing is used and defined as follows: Let $G_1$, $G_2$ and $G_T$ be three multiplicative cyclic groups whose order is prime p, element g is the generator of group $G_1$, element h is the generator of group $G_2$; then there is bilinear mapping $e: G_1 \times G_2 \to G_T$, and has the following properties:

1) Bilinear: for any $a, b \in \square_p^*$, $e(g^a, h^b) = e(g,h)^{ab}$;
2) Non-degenerate: $e(g, h) \neq 1$;
3) Computable: there exist a PPT algorithm to compute $e(g,h)$ Set this bilinear mapping system group be $S = \{p, G_1, G_2, G_T, e(\bullet,\bullet)\}$.

Embodiment 1

This embodiment is a formalization representation method of policy and rule. In this embodiment, the method refers to four attribute entities, corresponding access policies, and an authorization process. The detailed embodiment is described as follows, and it will be used in embodiment 3.

The subject attributes set S, including name and occupation, expressed as $S_1$, $S_2$. The name is represented by a string, such as two members {"John","Bob"}, which are formalized as $S_1 := \{s_{11}, s_{12}\}$. The occupation consists of two attribute values {Doctor, Nurse}, which are formalized as $S_2 := \{s_{21}, s_{22}\}$.

The object attribute set O, including file name and file type, expressed as $O_1$, $O_2$. The file name is a string which is formalized as $O_1 := \{0,1\}^n$. The file type includes two attribute values {WardRecord, PatientArchive} for "patient record" and "patient file", which are formalized as $O_2 = \{o_{21}, o_{22}\}$.

The action attribute set A, including browsing and rewriting operations, expressed as $A_1$, $A_2$. The browsing operation includes two attribute values {Read,Retrieval}, which are formalized as $A_1 := \{a_{11}, a_{12}\}$; the rewriting operation includes two attribute values {Write,Append}, which are formalized as $A_2 = \{a_{21}, a_{22}\}$.

The environment attributes set E, including time, expressed as $E_1$. The time includes two attribute values {Weekday,Weekend} for working day and weekend, which are formalized as $E_1 = \{e_{11}, e_{12}\}$.

There are two rules in this system:

Rule 1: the doctor can read the "patient record" at any time, which is formalized as $$R1 := (S_2 = \text{Doctor} \wedge O_2 = \text{WardRecord} \wedge A_1 = \text{Read}) =$$
$$(S_2 = s_{21} \wedge O_2 = o_{21} \wedge A_1 = a_{11}).$$

Rule 2: the nurse can read the "patient record" on working day, which is formalized as $$R2 := (S_2 = \text{Nurse} \wedge O_2 = \text{WardRecord} \wedge A_1 = \text{Read} \wedge E_1 = \text{Weekday}) =$$
$$(S_2 = s_{22} \wedge O_2 = o_{21} \wedge A_1 = a_{11} \wedge E_1 = e_{11}).$$

According to the above two rules, the access policy for "patient record" in hospitals is "doctors can read WardRecord at any time or nurses can read WardRecord on working days", which is formalized as $$\Pi := R1 \vee R2 = (S_2 = s_{21} \wedge O_2 = o_{21} \wedge A_1 = a_{11}) \vee$$
$$(S_2 = s_{22} \wedge O_2 = o_{21} \wedge A_1 = a_{11} \wedge E_1 = e_{11}).$$

The authorization process of access policy is a process of replacing the attribute variable with attribute assignment and decision-making on Boolean logic. For example, there are two subjects in the system, doctor John and nurse Bob.

If John requests for reading the WardRecord on working day, his attribute assignment set is $(S_1, S_2, O_2, A_1, E_1) \leftarrow (s_{11}, s_{21}, o_{21}, a_{11}, e_{11})$. After these attribute assignments are brought into policy $\Pi$, the determination result is permission, and this request is allowed;

In contrast, Bob requests for reading the WardRecord at weekends, and his attribute assignment set is $(S_1, S_2, O_2, A_1, E_1) \leftarrow (s_{12}, s_{22}, o_{21}, a_{11}, e_{12})$. After these attribute assignments are brought into policy $\Pi$, the determination result is denial, this request is denied.

Embodiment 2

This embodiment is a system for cryptographic attribute-based access control includes an encryption scheme, comprising:

1. System Initialization Algorithm (Setup): takes the bilinear mapping system $S = \{p, G_1, G_2, G_T, e(\bullet,\bullet)\}$ as input, output the public/private key pair of the policy center P and each entity $T \in \{S, O, A, E\}$.

1) randomly choose generator g and h in group $G_1$ and $G_2$, respectively;

2) randomly choose secret index $\alpha \in \square_p^*$, and compute $g^\alpha$;

3) output the public/private key pair of the policy center P is $pk_P = (g, h, g^\alpha)$ and $sk_P = (\alpha)$;

4) for each entity T, randomly choose the secret index $\beta_T$ and compute $g^{\beta_T}$;

5) the public/private key pair of the entity T is $pk_T = (g, h, g^{\beta_T})$ and $sk_T = (\beta_T)$.

2. Object Encryption Algorithm (Encrypt): takes the public key $pk_P$ of the policy center P as input, output the session key ek used for object encryption and the ciphertext $C_{ek}$ used to retrieve this key.
  1) randomly choose the secret index $w \in \Box_p^*$;
  2) randomly choose the session key $ek \in \{0,1\}^{|P|}$;
  3) compute $g^w$ and $ek \oplus e(g^\alpha, h)^w$;
  4) generate the ciphertext $C_{ek} = (c_1, c_2) = (g^w, ek \oplus e(g^\alpha, h)^w)$;
  5) the object is encrypted by using the session key ek with any general encryption algorithm.

3. Policy Generation Algorithm (PolicyGen): takes the access policy Π, ciphertext $C_{ek}$, and the private key $sk_P$ of the policy center P as inputes, output the cryptographic policy CP of Π.
  1) randomly choose the secret index $t \in \Box^*_p$ and compute $p_0 = c_1^{1/t} = (g^w)^{1/t}$;
  2) convert the access policy Π to $(M, \pi)$ according to the method in embodiment 3, where M is a l×n secret generation matrix, and l is the number of logical decision items in the policy;
  3) randomly choose n−1 secrets $y_i \in \Box_p$, and set $v = (t, y_2, \ldots, y_n)^T$, where the value of i is from 2 to n;
  4) compute $\lambda_k = M_k \cdot v$, where $M_k$ is the k-th row of the secret generation matrix M, and the value of k is from 1 to l;
  5) for k=1 to l, randomly choose $r_k \in \Box_p^*$, obtains the time-varying parameter τ, and compute $p_k = (p_{k1}, p_{k2})$, where $$\begin{cases} p_{k1} = (g^{\beta_T} \cdot g^\tau)^{r_k}, \\ p_{k2} = (h^a)^{\lambda_k} \oplus e(g^{\beta_T}, H(att)^{r_k}) \end{cases}.$$

6) output the ciphertext of policy as $CP = ((m, \pi), p_0, \{(p_{k1}, p_{k2})\}_{k=}^l)$.

4. Token Generation Algorithm (TokenGen): takes the private key $sk_T$ for entity $T \in \{S, O, A, E\}$ and its attribute att as input, output the security token AttToken of the attribute att.
  1) compute the hash value H(att) of attribute att;
  2) obtain the time-varying parameter τ (consistent with the value in PolicyGen);
  3) compute and output the attribute token of attribute att as $$AttToken = H(att)^{\frac{\beta_T}{\beta_T + \tau}}.$$

5. Object decryption algorithm (Decrypt): takes the policy Π and its ciphertext CP, all attribute tokens AttTokens obtained from each entity, ciphertext $C_{ck}$ of session key as inputes, output the session key ek.
  1) For k=1 to l, compute over the cryptographic policy $p_k = (p_{k1}, p_{k2})$ and the attribute token AttToken as $$permit_k = p_{k2} \oplus e(p_{k1}, AttToken);$$

2) compute the decryption token according to the matrix M and $I = \{i : \pi(i) \in U\}$, compute the constant set $\{\omega_i \in \Box_p^*\}_{i \in I}$ under the method in embodiment 3, and acquire the decryption token as $$DecToken = \Pi_{i \in I} permit_i^{\omega_i};$$

3) retrieve ek by computing the following equation:

$$c_2 \oplus e(DecToken, p_0) = ek.$$

4) decrypt the object with the retrieved session key ek.

The Correctness of the Proposed Scheme:
The scheme is correct. For the request satisfying the access policy, the access authorization is completed by computing the following equations to retrieve the session key ek:
The equation of step 1) in Decrypt algorithm is as follows:

$$\begin{aligned} permit_k &= p_{k2} \oplus e(p_{k1}, AttToken) \\ &= (h^a)^{\lambda_k} \oplus e(g^{\beta_T}, H(att)^{r_k}) \oplus \\ &\quad e\left((g^{\beta_T} \cdot g^\tau)^{r_k}, H(att)^{\frac{\beta_T}{\beta_T + \tau}}\right) \\ &= (h^a)^{\lambda_k} \oplus e(g^{\beta_T}, H(att)^{r_k}) \oplus e\left((g^{\beta_T + \tau})^{r_k}, H(att)^{\frac{\beta_T}{\beta_T + \tau}}\right) \\ &= (h^a)^{\lambda_k}. \end{aligned}$$

The equation of step 2) in Decrypt algorithm is as follows:

$$\Pi_{i \in I} permit_i^{\omega_i} = (h^\alpha)^{\Sigma_{i \in I} \omega_i \lambda_i} = h^{\alpha t} = DecToken.$$

The equation of step 3) in Decrypt algorithm is as follows:

$$\begin{aligned} c_2 \oplus e(DecToken, p_0) &= ek \oplus e(g^\alpha, h)^w \oplus e(h^{\alpha t}, g^{w/t}) \\ &= ek \oplus e(g^\alpha, h)^w \oplus e(h^\alpha, g)^w \\ &= ek. \end{aligned}$$

Security Description of the Proposed Scheme:
The proposed cryptographic scheme satisfies the following security properties:

1. The attribute token is used as the credential of the attribute. It is existentially unforgeable under the chosen-time-varying parameter attack, that is, the attacker cannot forge a valid token for a new time-varying parameter when obtaining a large number of valid tokens for other time-varying parameters. It is existentially unforgeable under the chosen-attribute attack, that is, the attacker cannot forge a valid token for a new attribute when obtaining a large number of valid tokens for other attributes.

2. The cryptographic policy is related to the policy Π and object ciphertext, and cannot be tampered with once generated. It is existentially unforgeable under the chosen-object attack, that is, the attacker cannot forge a new valid cryptographic policy for a certain object. In addition, the cryptographic policy is time-sensitive, which guarantees it can avoid replay attacks.

3. The decryption token is one-time decryption, and the valid token is indistinguishable from a random number, which makes it unforgeable.

4. The session key has semantic security, i.e., the session key is indistinguishable from the random binary string.

Embodiment 3

This embodiment takes the access policy in embodiment 1 as an example to give a transformation process for generating the cryptographic policy. This embodiment is also a detailed description for steps 2), 4) in the policy generation algorithm (PolicyGen), and step 2) in the object decryption algorithm (Decrypt).

An access policy Π consists of one or more rules. As mentioned above, in a medical diagnostic recording system, the doctor "John" want to read the WardRecord on Monday. At the same time, the access policy was set as "doctors can read patient record WardRecord at any time or nurses can read WardRecord on working days", which can be formalized as:

$$\Pi := (S_2 = s_{21} \wedge O_2 = o_{21} \wedge A_1 = a_{11}) \vee$$
$$(S_2 = s_{22} \wedge O_2 = o_{21} \wedge A_1 = a_{11} \wedge E_1 = e_{11}).$$

This access policy can be formally describe by using the following access matrix:

$$A = \begin{pmatrix} P_1 & P_2 & P_3 & P_4 & P_5 \\ 1 & 0 & 0 & 1 & 1 \\ 0 & 1 & 1 & 1 & 1 \end{pmatrix},$$

where $P_1$, $P_2$, $P_3$, $P_4$ and $P_5$ represent the predicates $S_2 = s_{21}$, $S_2 = s_{22}$, $E_1 = e_{11}$, $O_2 = o_{21}$ and $A_1 = a_{11}$, respectively. Such that the access policies can be formalized as $$(P_1 \wedge P_4 \wedge P_5) \vee (P_2 \wedge P_3 \wedge P_4 \wedge P_5) = (P_1 \vee (P_2 \wedge P_3) \wedge P_4 \wedge P_5).$$

Let the function $\pi$ denote the mapping from the i-th column to $P_i$, i.e., $\pi(i) = P_i$. In addition, the policy has two authorization sets: $U_1 = \{P_1, P_4, P_5\}$ and $U_2 = \{P_2, P_3, P_4, P_5\}$.

Figure 1:
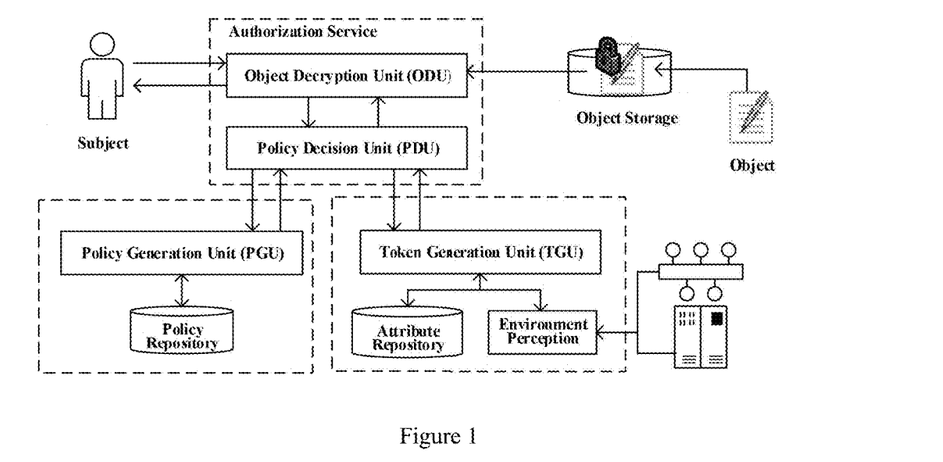
FIG. 1 is the structural diagram of the system for cryptographic attribute-based access control supporting dynamic rules.
Figure 2:
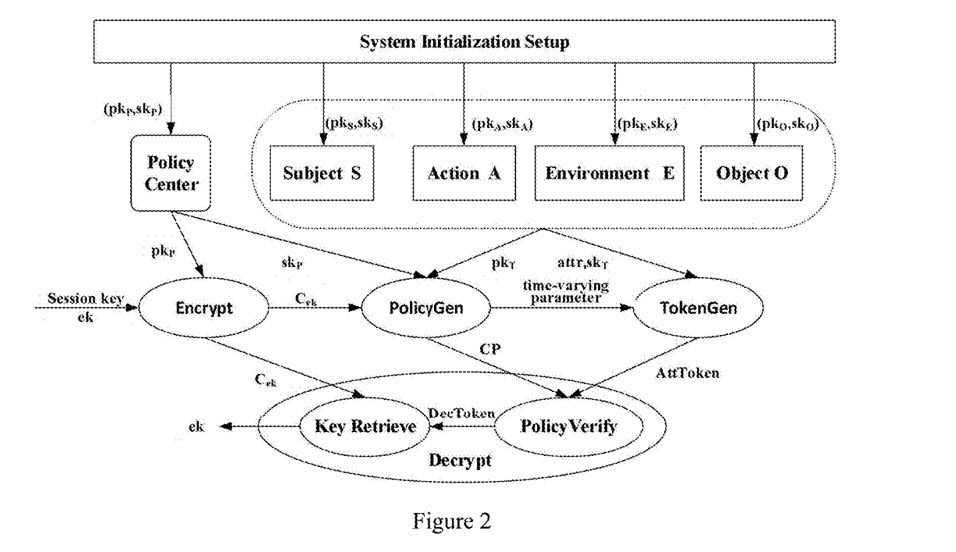
FIG. 2 is the flowchart of the method for cryptographic attribute-based access control supporting dynamic rules.
Figure 3:
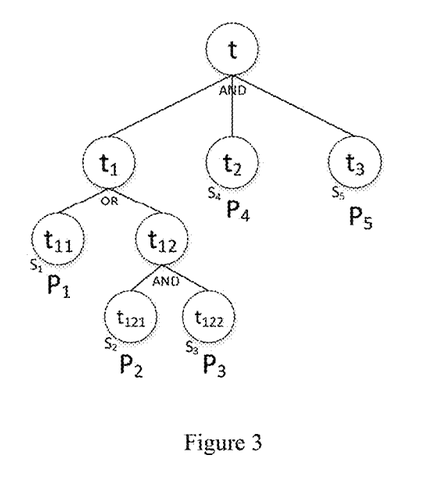
FIG. 3 is an access control tree in Embodiment 3.

The policy is represented as an access policy tree, as shown in FIG. 3, where the root node t is the secret selected by the policy center P (see step 1) in PolicyGen); the leaf nodes $t_{11}$, $t_{121}$, $t_{122}$, $t_2$, $t_3$ represent the secrets of the predicates $P_1$, $P_2$, $P_3$, $P_4$ and $P_5$, respectively; $s_1$, $s_2$, $s_3$, $s_4$ and $s_5$ represent the random numbers selected by $P_1$, $P_2$, $P_3$, $P_4$ and $P_5$, respectively; non-leaf nodes represent the logical "AND" and "OR" relationship between its child nodes. Next, the secret generation matrix M and the function $\pi$ are generated by using the access policy tree (see step 2) in PolicyGen). According to the random numbers chosen by each predicate, the construction for matrix M is shown as following:

$$M = \begin{bmatrix} 1 & s_1 & s_1^2 & 0 \\ 1 & s_1 & s_1^2 & s_2 \\ 1 & s_1 & s_1^2 & s_3 \\ 1 & s_4 & s_4^2 & 0 \\ 1 & s_5 & s_5^2 & 0 \end{bmatrix}.$$

In this embodiment, as in step 3) of PolicyGen, set $v = (t, y_2, y_3, y_4)^T \in \square_p^4$, and $M \cdot v = (t_{11}, t_{121}, t_{122}, t_2, t_3)^T$ can be acquired. Let $M_k$ denote the k-th row of the matrix M, then $\lambda_k = M_k \cdot v$ is the secret that belongs to $P_k$ (see step 4) in PolicyGen), i.e., $$(\lambda_1, \lambda_2, \lambda_3, \lambda_4, \lambda_5)^T = (t_{11}, t_{121}, t_{122}, t_2, t_3)^T.$$

For this embodiment, $U_1 = \{P_1, P_4, P_5\}$ is an authorization set. Let $I = \{i : \pi(i) \in U_1\} = \{1, 4, 5\}$, and choose three rows $M_1$, $M_4$ and $M_5$ of the matrix M corresponding to $P_1$, $P_4$, $P_5$ as the reconstruction matrix. Therefore there exist constants $\omega_1$, $\omega_4$ and $\omega_5$ such that $$\omega_1 M_1 + \omega_4 M_4 + \omega_5 M_5 = (1\ 0\ 0\ 0).$$

In doing so, the corresponding values of $M_1$, $M_4$ and $M_5$ are plugged into the above equation, so $$(\omega_1, \omega_4, \omega_5) \cdot \begin{pmatrix} M_1 \\ M_4 \\ M_5 \end{pmatrix} = (\omega_1, \omega_4, \omega_5) \cdot \begin{pmatrix} 1 & s_1 & s_1^2 & 0 \\ 1 & s_4 & s_4^2 & 0 \\ 1 & s_5 & s_5^2 & 0 \end{pmatrix} = (1, 0, 0).$$

As a result, the values $\omega_1$, $\omega_4$ and $\omega_5$ can be computed polynomial time according to the inverse of Vandermonde's matrix, and the result is showed as follows:

$$\begin{cases} \omega_1 = \frac{s_4 s_5}{(s_1 - s_4)(s_1 - s_5)} \mod p; \\ \omega_4 = \frac{s_1 s_5}{(s_4 - s_1)(s_4 - s_5)} \mod p; \\ \omega_5 = \frac{s_4 s_1}{(s_5 - s_1)(s_5 - s_4)} \mod p \end{cases}$$

Because $$M \cdot v = \begin{pmatrix} M_1 \\ M_2 \\ M_3 \\ M_4 \\ M_5 \end{pmatrix} \cdot (t, y_2, \ldots, y_n)^T = (\lambda_1, \lambda_2, \lambda_3, \lambda_4, \lambda_5)^T$$

and $v = (t, y_2, \ldots, y_n)^T$, the secret t can be retrieved by the following equation:

$$\sum_{i \in I} \omega_i \lambda_i = \omega_1 \lambda_1 + \omega_4 \lambda_4 + \omega_5 \lambda_5$$
$$= (\omega_1, \omega_4, \omega_5) \cdot (\lambda_1, \lambda_4, \lambda_5)^T$$
$$= (\omega_1, \omega_4, \omega_5) \cdot \begin{pmatrix} M_1 \\ M_4 \\ M_5 \end{pmatrix} \cdot (t, y_4, y_5)^T$$
$$= (1, 0, 0) \cdot (t, y_4, y_5)^T$$
$$= t.$$

And then the decryption token is computed as DecToken=$\Pi_{i \in I}$permit$_i^{\omega_i}$=(h$^\alpha$)$^{\Sigma_{i \in I} \omega_i \lambda_i}$=h$^{\alpha t}$. Further, the session key ek can be retrieved by computing $c_2 \oplus e(DecToken, p_0)$. Finally, the doctor "John" can use the recovered session key ek to decrypt the WardRecord and read the relevant content.

The system and method for cryptographic attribute-based access control supporting dynamic rules in this invention has been separated from the traditional encryption system framework, is a brand-new ABAC method and system supporting cryptographic determination, and can meet higher security requirement: policy scalability and attribute assignment dynamics. The proposed system can be widely applied to sensitive data distribution in untrusted, open environments, rule-based authorization services, and secure sharing of private data among different security domains.

The invention claimed is:

1. A computer enhanced cryptographic system for cryptographic attribute-based access control supporting dynamic rules, adopting the attribute-based access control model, wherein the computer enhanced cryptographic system comprises:
   three storage modules and one perception module:
   a policy storage module (PSM) is used to store access policies;
   an attribute storage module (ASM) is used to store attributes and attribute assignments of entities in the system;

an object storage module (OSM) is used to store encrypted objects;

an environment perception module (EPM) is used to obtain environment attributes and attribute assignments in real-time and dynamically;

also comprising four function units:

a policy generation unit (PGU) selects an access policy from PSM, generates a cryptographic representation of the access policy, i.e., cryptographic policy (CP), and provides it to policy decision unit;

a token generation unit (TGU) acquires an attribute assignment of a specific attribute from ASM or EPM, and generates a cryptographic representation of the attribute assignment, i.e., attribute token (AttToken), and provides all possible AttTokens to policy decision unit;

a policy decision unit (PDU) obtains CP from PGU and AttTokens from TGU, makes cryptographic policy decision on them to generate the determination result information, i.e., decryption token (DecToken), which is provided to object decryption unit;

an object decryption unit (ODU) decrypts the encrypted object according to DecToken returned by PDU, i.e., ODU can decrypt the encrypted object if and only if the determination result of PDU is permission.

2. The computer enhanced cryptographic system according to claim 1, adopting the attribute-based access control model, wherein the computer enhanced cryptographic system comprises:

an entity set of four attribute entities for subject, object, action, and environment, which are represented by S, O, A, E, respectively; and a policy center P to manage access policies;

an access policy of several rules which can be converted into the form of Boolean function, i.e., using the Boolean function $F(x_1, x_2, \ldots x_n) = \{True, False\}$ to describe a logical relationship between any attribute variable $x_i \in X$ in the attribute entity $X \in \{S, O, A, E\}$ and the access permission (True) or denial (False);

authorization process is used to obtain attribute values $(v_1, v_2, \ldots, v_n) \rightarrow (x_1, x_2, \ldots, x_n)$ from each attribute entity, and match them with the specified access policy, i.e., making evaluation on $F(v_1, v_2, \ldots, v_n)$ to determine whether the access is authorized.

3. The computer enhanced cryptographic system according to claim 2, wherein the rules have the same grammar structure as the access policy, and can be combined as a access policy by using Boolean logic; the rules can be represented as Boolean functions whose inputs are attribute variables, and Boolean function is composed of Boolean logics on several predicates, each of which is a logical decision on operator that acts on attribute variables; the Boolean logics include logical AND, OR, and NOT; the operators include Equality, Greater than, Less than, positive and negative membership, and containment relationship.

4. The computer enhanced cryptographic system according to claim 1, adopting two kinds of security tokens, AttToken and DecToken, which are temporary, unforgeable, and publicly verifiable digital certificate, and their validity can be proved by using cryptographic verification methods, wherein the AttToken is a cryptographic certificate for attribute assignment, comprises non-tamperable information of attributes and attribute values, and time-varying parameter information to ensure unforgeability and instantaneous validity of the token; wherein the time-varying parameter information can be a random number, a count value, or a time stamp;

the DecToken is a cryptographic certificate for decrypting the ciphertext of the session key, and comprises secret information and time-varying parameter information for retrieving the session key which is required for decrypting the encrypted object.

5. The computer enhanced cryptographic system according to claim 1, wherein object is stored in an encrypted form, and the encryption algorithm can be any symmetric and asymmetric encryption algorithm, and the session key used to encrypt the object is escrowed into policy center in an encrypted form;

distributed authorization is implemented by replacing decryption keys with AttTokens, and these tokens are publicly verifiable;

the AttToken can be acquired in a dynamic and real-time way, and the policy determination result may be different when the same subject has the same access request to the same object in different environments;

cryptographic policy from PGU is dynamically generated such that it can be changed in real-time to affect the access authorization result;

whether the encrypted object can be decrypted is determined by PDU, i.e., the subject can access the object if and only if the determination result is permission.

6. A computer enhanced cryptographic method for cryptographic attribute-based access control supporting dynamic rules, in the computer enhanced cryptographic system according to claim 1, comprising the steps of:

1) object encryption: the object is stored in OSM in an encrypted form, and records all attribute information of the object in ASM;

2) subject's access request: a certain subject issues an access request to an encrypted object, the ODU receives the request and invokes the PDU to perform cryptographic determination on the request;

3) access authorization decision: after receiving the information of ODU, the PDU issues a policy query request to PGU and token query requests to TGUs for each attribute, performs cryptographic determination on the cryptographic policy returned by PGU and the AttTokens returned by TGUs, sends the determination result and the DecToken to ODU;

4) object decryption: ODU decrypts the encrypted object according to the DecToken returned by PDU, and then the subject can access the decrypted object.

7. The computer enhanced cryptographic method according to claim 6, wherein the access authorization decision process comprises the cryptographic determination of a given access request is to make decision on the AttTokens and the cryptographic policy CP, and output the DecToken for object decryption;

if the determination result of the cryptographic policy is permission, the DecToken is secret information for retrieval of the session key which can be used for the object decryption;

otherwise, it is an invalid random number.

8. A computer enhanced cryptographic method for cryptographic attribute-based access control supporting dynamic rules, which applies to claim 1, comprising:

1) system initialization: invoke the system initialization algorithm Setup to generate the public key $pk_T$ and the private key $sk_T$ of each entity T and the public key $pk_P$ and the private key $sk_P$ of the policy center P, where T∈{S,O,A,E};
2) object encryption: invoke the object encryption algorithm Encrypt to encrypt the object, realize key escrow of the session key ek on the policy center P, i.e., applying the general encryption algorithm to encrypt the object by using ek, and then encrypting ek by using the public key $pk_P$ of the policy center P; this phase is used to implement the OSM;
3) policy generation: select a policy according to the current access request, invoke the policy generation algorithm PolicyGen to generate the cryptographic policy CP of Π by using the public key $pk_T$ of entity T and the private key $sk_P$ of policy center P; this phase is used to implement the PGU;
4) token generation: obtain the attribute assignment attr in real-time, invoke the token generation algorithm TokenGen to generate AttToken corresponding to attr; this phase is used to implement the TGU;
5) object decryption: the object decryption algorithm Decrypt is divided into two stages, wherein,
   a) policy verification: perform cryptographic determination according to the cryptographic policy CP and the AttTokens related to the policy Π, output the DecToken for object decryption; this phase is used to implement the PDU;
   b) session key retrieval: if the DecToken is valid, the session key ek can be retrieved to decrypt the encrypted object and the requested action will be performed; otherwise, the key ek cannot be retrieved and the current access will be denied; this phase is used to implement the ODU.

9. The computer enhanced cryptographic method according to claim 8, further comprising system initialization algorithm Setup: given a specified security strength, generate public key $pk_P$ and private key $sk_P$ for the policy center P, and public key $pk_T$ and private key $sk_T$ for each entity T∈{S, O, A, E};
   object encryption algorithm Encrypt:given the public key $pk_P$ of policy center P, generate ciphertext $C_{ek}$ of session key ek, and the session key ek can be used for decrypting the encrypted object;
   token generation algorithm TokenGen:given private key $sk_T$ of entity T∈{S, O, A, E}, an attribute value attr, and a time-varying parameter t, generate the attribute token AttToken;
   policy generation algorithm PolicyGen:given the public key $pk_T$ of each entity T∈{S, O, A, E}, the private key $sk_P$ of policy center P, an access policy Π, the time-varying parameter t, and the ciphertext $C_{ek}$ of session key ek, generate cryptographic policy CP of Π;
   object decryption algorithm Decrypt : given the ciphertext $C_{ek}$ of session key ek, the ciphertext CP of policy Π, and a set of AttTokens corresponding to the attribute assignments, the session key ek can be retrieved if and only if the attribute assignments satisfy the policy Π.

* * * * *